Dec. 12, 1939.  E. P. KINNE  2,183,501
COUPLER
Filed Aug. 15, 1936  6 Sheets-Sheet 1
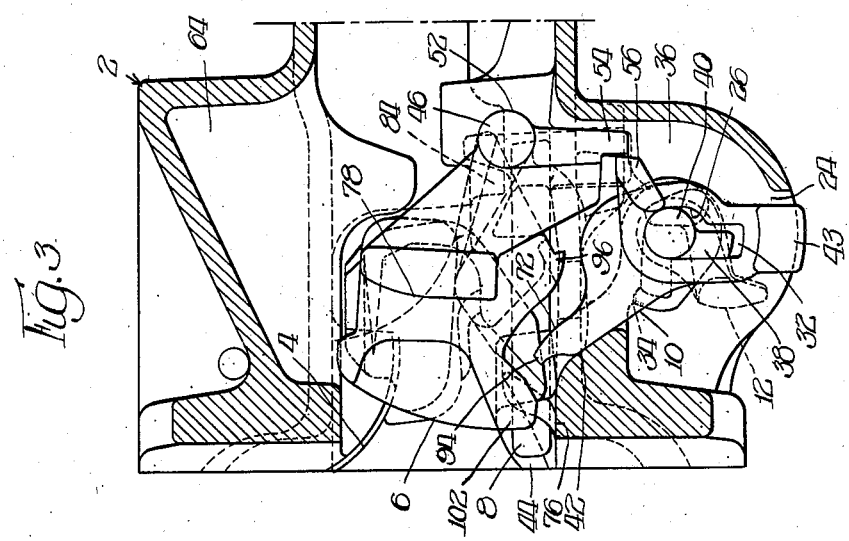
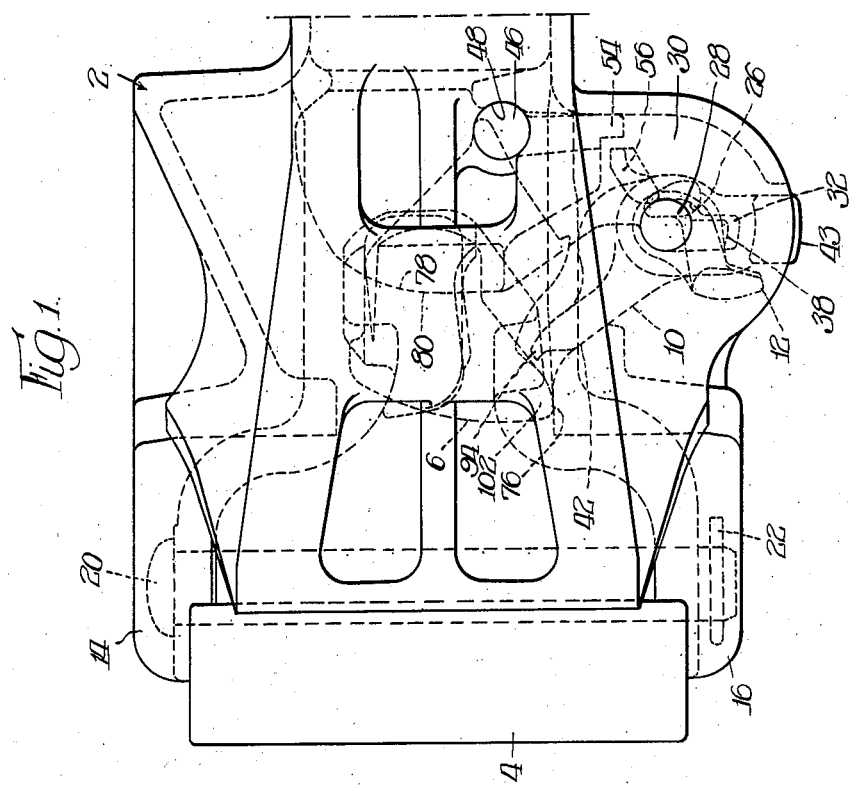
Inventor:
Edmund P. Kinne
By Irvin O. B. Garner
atty.

Dec. 12, 1939.   E. P. KINNE   2,183,501
COUPLER
Filed Aug. 15, 1936   6 Sheets-Sheet 2

Inventor:
Edmund P. Kinne,
By Orrin O. B. Garner  atty

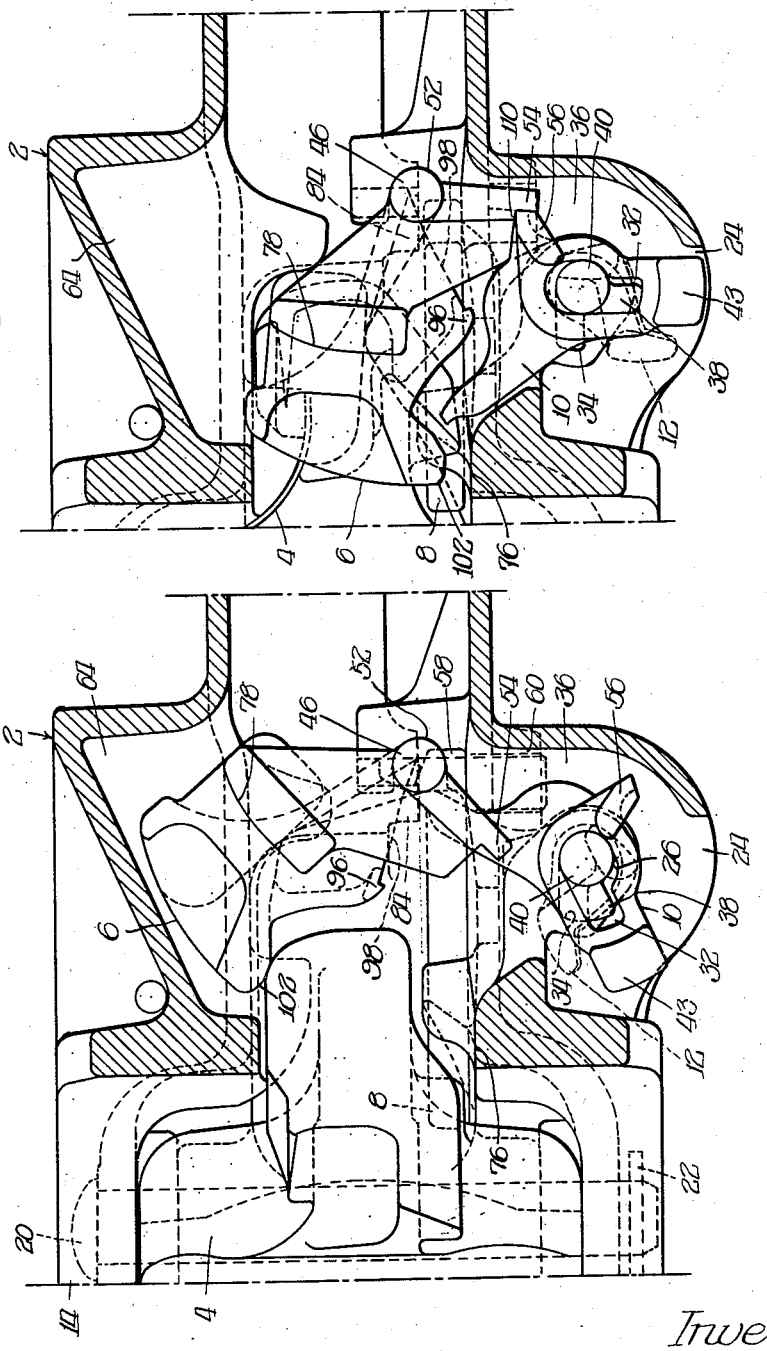

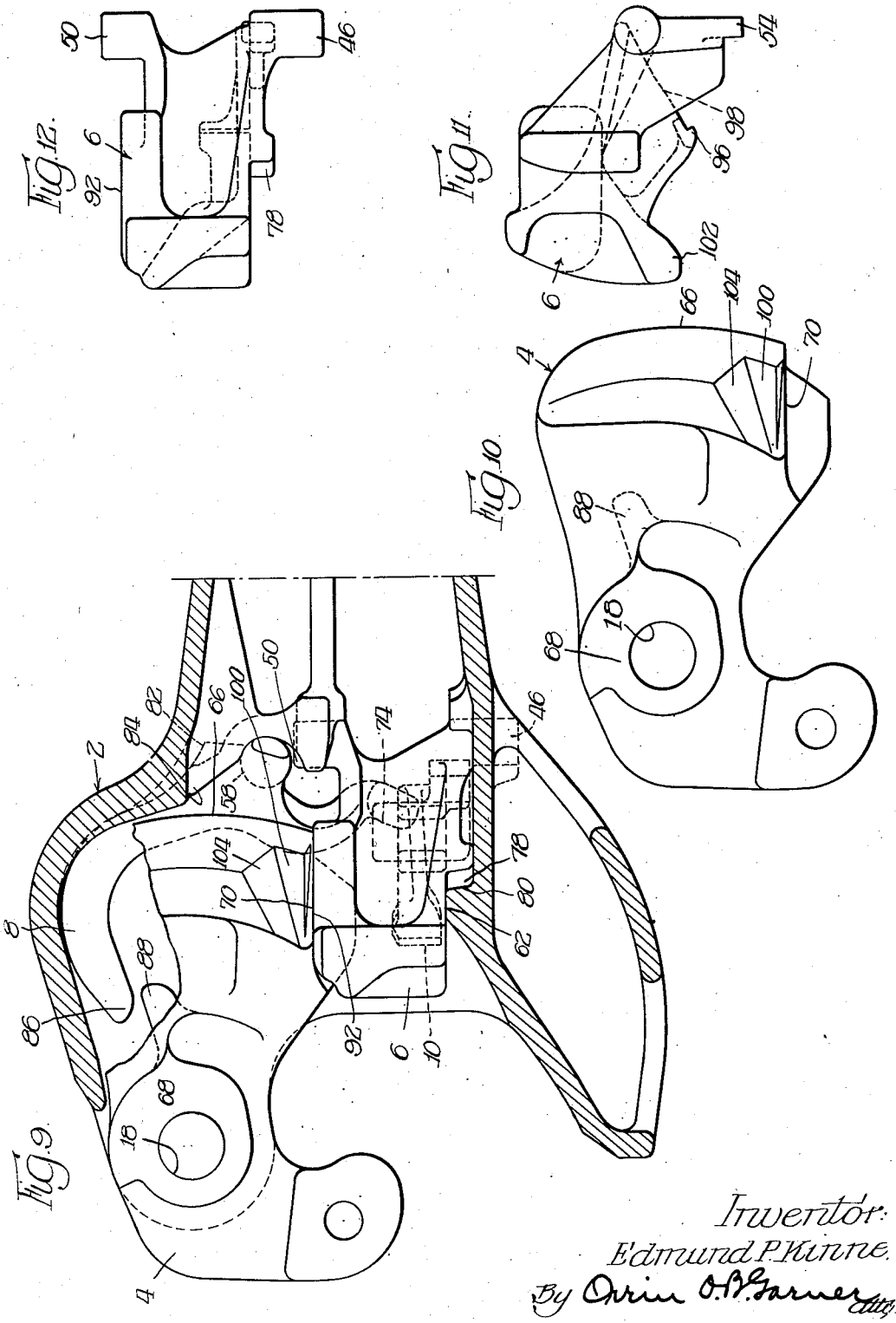

Dec. 12, 1939. E. P. KINNE 2,183,501
COUPLER
Filed Aug. 15, 1936 6 Sheets—Sheet 6
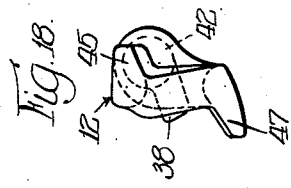
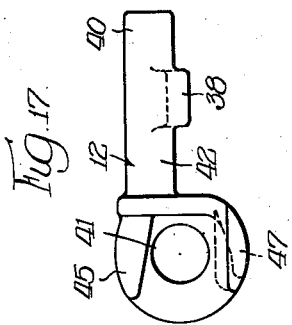
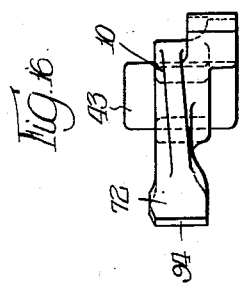
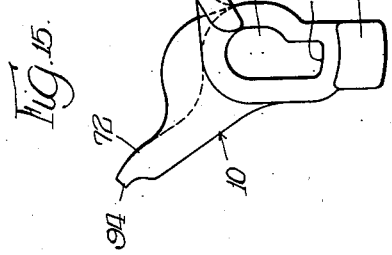
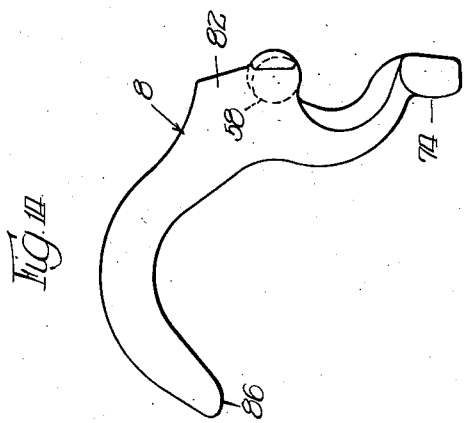
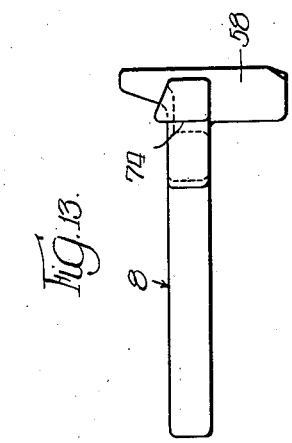
Inventor:
Edmund P. Kinne,
By Arin O. B. Garner attr.

Patented Dec. 12, 1939

2,183,501

UNITED STATES PATENT OFFICE 2,183,501

COUPLER

Edmund P. Kinne, Alliance, Ohio, assignor to American Steel Foundries, Chicago, Ill., a corporation of New Jersey Application August 15, 1936, Serial No. 96,220

27 Claims. (Cl. 213—129)

My invention relates to car couplers and more particularly to a novel type of coupler, making use of the form of knuckle at present designated as standard by the Association of American Railways.

An object of the invention is to improve the operation of the coupler mechanism by providing novel features to insure more positive and efficient operation.

Still another object is to provide a simplification of arrangement of parts wherein all the parts are securely held in their proper relationship and so guided as to facilitate smooth and easy operation.

A more specific object is to make an improved design and highly efficient knuckle throw structure which will be both easy and positive in operation.

A still further object is to provide a novel form of anti-creep arrangement which is positive against creeping action of the lock and also positive against bouncing action to which such structures are frequently subjected.

Yet another object is to provide such a positive anti-creep arrangement with a method of anti-creep release and form of unlocking which is likewise positive and certain.

Yet another object of my invention is to provide a positive lock-set arrangement which has great stability, that is to say, a lock-set structure which will remain in lock-set position and not be jolted therefrom and which will at the same time admit of positive release.

Still another object of my invention is to provide a coupler wherein the parts are so constructed that coupling is sure and positive regardless of the speed at which the opposed couplers are brought together and wherein the very impact of the opposing couplers imparts an impetus to the lock, thus causing it to drop more quickly and so insuring coupling.

My invention further contemplates such an arrangement of parts as will prevent the lock from bouncing into lock-set position, thus insuring that the lock will fall to the locked position at the time of impact.

My invention still further contemplates the above-mentioned improvements in structure and operation while at the same time maintaining a minimum amount of rotation of the operating rod used in manipulation of the parts.

With these and various other objects in view, my invention may consist of certain novel features of construction and operation as will be more fully described and particularly pointed out in the specification, drawings and claims appended hereto.

In the drawings which illustrate embodiments of my invention and wherein like reference characters are used to designate like parts—

Figure 1 is a fragmentary side elevation of a coupler embodying my invention with the parts shown in normal locked position;

Figure 3 is a sectional side elevation of the coupler shown in Figures 1 and 2 with the front portion of the coupler head and knuckle cut away for purposes of simplification. In Figure 3 I have shown the parts in the position which they assume when the anti-creep is operative.

Figure 7 is another similar view except that still more is shown of the coupler head and of the knuckle and in this view the parts are shown in full knuckle throw position;

Figure 8 is a view similar to Figure 3, illustrating the maximum movement of the parts and functioning of the anti-creep under bouncing or jolting action;

Figure 9 is a top view of the coupler structure with portions of the head and knuckle cut away in order more clearly to show the relationship of the parts;

Figure 6:
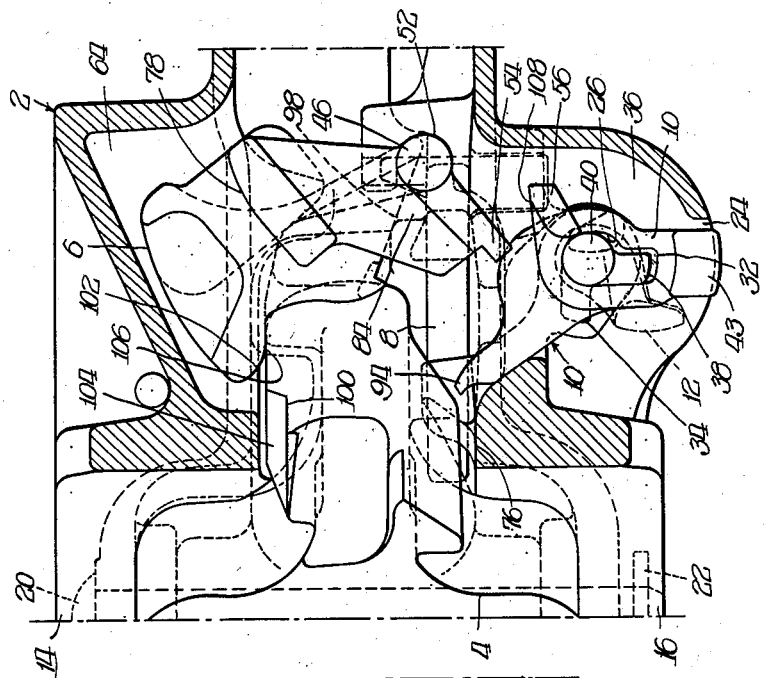
Figure 6 is a similar view except that larger portions of the front end of the coupler head and of the knuckle are shown and wherein the parts are in released position following partial knuckle throw or removal from lock-set position.

Figure 10 is a top plan view of the Standard A. A. R. knuckle structure which is incorporated in my novel coupler structure;

Figure 11 is a side elevation of the lock structure, and Figure 12 is a top plan view thereof;

Figure 13 is a side elevation of the knuckle thrower, the view being taken from the guard arm side, and Figure 14 is a top plan view thereof;

Figure 15 is a side elevation of the lock lifter, the view being taken from the guard arm side, and Figure 16 is a top plan view thereof; and Figure 17 is a side elevation of the rotor and Figure 18 is an end elevation thereof.

Describing my invention in more detail, the coupler head 2 forms a casing-like structure within which are received the other operative parts including the knuckle 4, the lock 6, the knuckle thrower 8, the lock lifter 10, and the rotor 12. As already indicated, the knuckle 4 conforms in shape and design to the standard knuckle as used on American railways and specified by the Association of American Railways. The coupler head is provided with the upper and lower pivot lugs 14 and 16 having the aligned openings 18 for the reception of the knuckle pin 20 which is secured in position after assembly by the usual cotter key 22.

Figure 2:
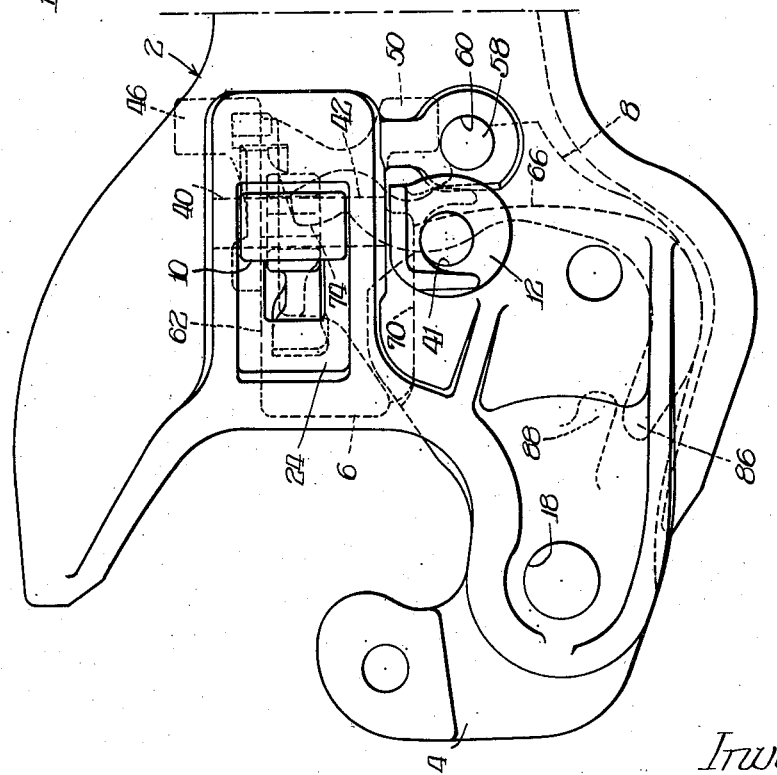
Figure 2 is a bottom view of the coupler shown in Figure 1 with the parts in the said normal locked position.

It is believed that understanding of the invention will be facilitated by a description of the method of assembly of the various parts followed by a detailed description where such appears necessary. The lock lifter 10 is first applied by inserting it upward through the opening 24 in the bottom of the coupler head where it is placed in a position in which the receiving hole 26 (Figure 15) is in alignment with the opening 28 (Figure 1) formed in the depending vertical wall 30 (Figure 1) of the coupler head. The lifter 10 is then rotated until the slot 32 (Figure 15), forming a portion of the hole 26, registers with the corresponding slot 34 formed in the depending wall 36 of the coupler head. The rotor 12 is then inserted through the slot 34, which is provided with a cylindrical bearing portion at one end as hereinafter more fully described, and on through the hole 26 in the lifter until the key portion 38 (Figure 17) is wholly within the slot 32 and the trunnion 40 (Figure 17) is received within the opening 28 while the other trunnion portion 42 of the rotor has bearing within the above-mentioned cylindrical portion of the slot 34. The rotor 12 has the usual eye 41 and the opposing shoulders 45 and 47 for connection to and engagement with an operating rod in the manner well known to the art. The lifter and the rotor are then released and allowed to rotate in a counter-clockwise direction as viewed in Figures 3 to 8 until the forward end of the lifter rests in contact with the lower front wall of the coupler head as at 42 (Figures 1 and 3). This rotation will occur by force of gravity under the impulse imparted by the counter-weight portion 43 of the lifter 10. The key 38 of the rotor is then confined between the side walls 30 and 36 of the coupler head. In this position and in the various other operative positions hereinafter to be described, the rotor 12 and the lifter 10 are thus locked against removal between the walls 30 and 36 of the coupler head. The lock 6 is next inserted through the front face opening 44 (Figure 3) of the coupler head and moved laterally therein toward the guard arm side of the coupler head until the trunnion 46 (Figure 12) passes into the hole 48 formed in the vertical wall of the coupler head. The opposite trunnion 50 (Figure 12) of the lock 6 will then seat in the trunnion pocket 52 (Figure 3) centrally formed on the bottom wall of the coupler head near the rear of the cavity formed therein, its position being most clearly shown in Figure 9. In thus seating the lock in its normal position, the anti-creep lug 54 at the base of the lock rearwardly will be in position behind the anti-creep stop 56 formed at the back of the lifter 10. The rotor 12 is then turned in a clockwise direction as viewed in Figure 4, at the same time rotating the lifter 10 until the anti-creep stop 56 is below the anti-creep lug 54, thus releasing the lock 6 for rotation likewise in a clockwise direction. The lock 6 is then raised or rotated in the said clockwise direction into its uppermost position and the lifter 10 and rotor 12 permitted to fall back to their normal position (Figure 6). With the lock 6 thus held in its uppermost position, the thrower 8 is applied through the face opening 44 of the coupler head and the trunnion 58 inserted into the hole 60 (Figure 2) formed in the bottom wall of the coupler head centrally thereof and adjacent the previously mentioned trunnion pocket 52 of the lock 6. In this position the upper portion of the trunnion 58 projects upwardly adjacent the end of the lock trunnion 50 and prevents its moving laterally out of the pocket in which it seats (Figures 2 and 9). Also, with the lock 6 thus in raised position, it is further confined against lateral movement between the locking face wall 62 (Figure 2) on the guard arm side of the coupler and the opposite wall 64 (Figure 3). With the lock 6 thus held in its uppermost position and the thrower 8 thus seated, the rotor 12 and the lifter 10 are turned to the position shown in Figure 5 and the lock is lowered until it assumes the lock-set position shown in this figure and hereinafter more fully described. The knuckle 4 is then applied through the face opening 44, the tail portion 66 (Figure 10) being positioned beneath the forward portion of the lock 6, and the knuckle is secured in position with its hub portion 68 (Figure 10) between the upper and lower pivot lugs 14 and 16 (Figure 1) wherein it is secured by means of the pivot pin 20 as previously described.

The coupler parts are now completely assembled and the knuckle 4 may be rotated to its closed position (Figures 1 and 2) where the lock 6 will drop into its normal position between the locking wall 62 (Figure 1) on the guard arm side of the coupler head and the locking face 70 (Figure 9) of the knuckle 4.

The rotor 12 is locked against accidental removal by the key 38 which is confined within the slot 32 of the lifter 10 and after the parts are completely assembled, the lifter is prevented from rotating in a clockwise direction to the position it occupied when the rotor was assembled as above described by abutment of the lifter face 72 (Figure 15) against the surface 74 (Figure 14) on the tail end of the thrower 8. Thus, after assembly, the lifter cannot be rotated to a position where the key 38 and its confining slot 32 are in alignment with the corresponding slot 34 (Figure 5) formed in the coupler head for the purpose of assembly.

Figure 4:
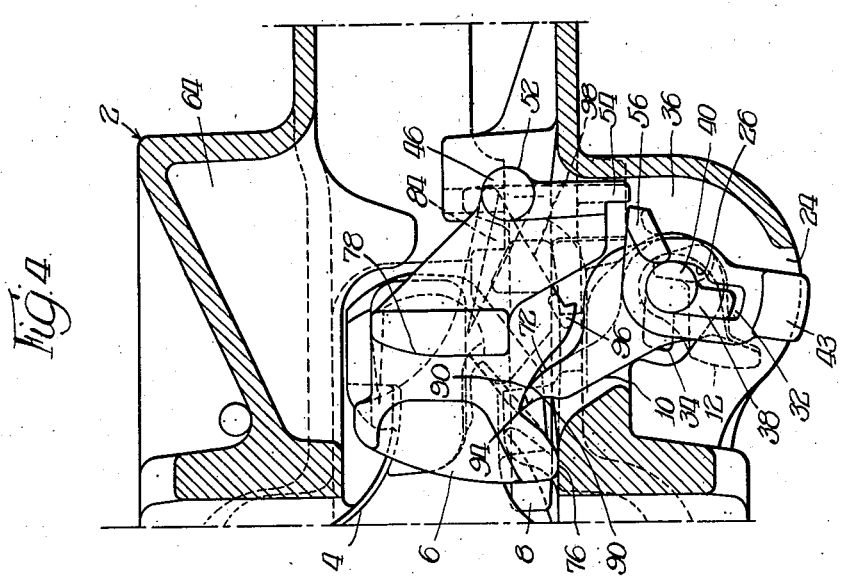
Figure 4 is a view similar to Figure 3 except that the parts are shown with the anti-creep released just at the start of the lock lifting operation.

When the parts are in normal locked position, the lowermost portion of the front end of the lock 6 rests upon the bottom wall of the coupler head as at 76 (Figures 1 and 4). The tendency for the lock to move forward under pulling stresses is resisted by its trunnions 46 and 50 which are seated respectively as previously described and also by the engagement of the pulling lug 78 of the lock against the pulling surface 80 in the coupler head (Figures 1 and 9).

After the parts have been assembled, the knuckle thrower 8 is retained in its assembled position with the trunnion 58 confined within the hole 60 in the bottom wall of the coupler head by the fact that the shoulder 82 underlies the projecting shelf 84 (Figure 9), formed as an integral part of the coupler head. After the knuckle has been assembled, the rotation of the thrower 8 is limited by engagement of its forward end 86 with the thrower pad or lug 88 integrally formed on the knuckle 4 (Figure 9), thus preventing the extended shoulder 82 on the thrower 8 from moving forward to a position where it would not underlie the projecting shelf 84.

Figure 5:
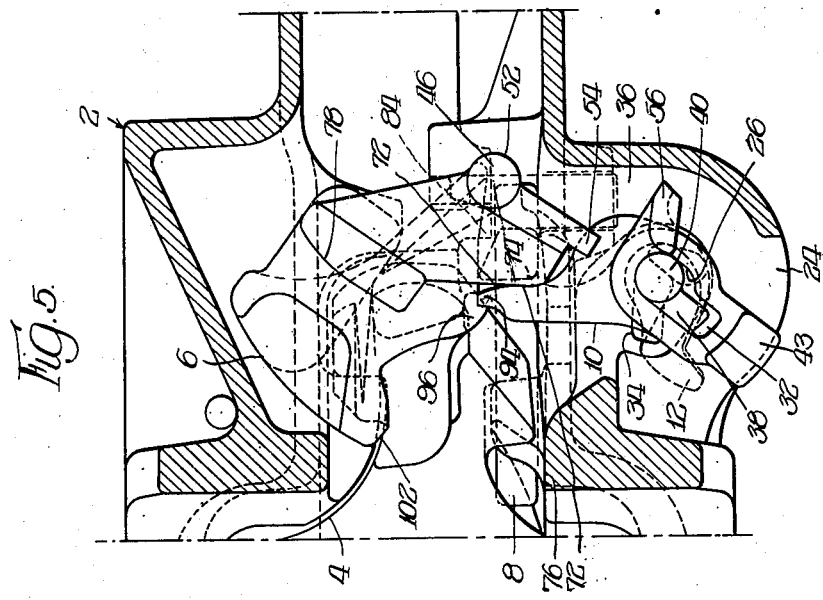
Figure 5 is another view similar to Figures 3 and 4 with the parts shown in lock-set position.

In use, the methods of operation of the various parts of the coupler are as follows:

In unlocking or lock-setting the coupler the rotor 12 is turned in a clockwise direction as viewed in Figures 3 to 8 by means of an operating rod (not shown), the end or eye of which extends through the rotor eye 41. As this rotation takes place the lifter 10 is turned from its rest position of Figures 1 and 3 to the anti-creep release position shown in Figure 4, the lug 56 moving downwardly below the lower end of the lock lug 54 so that said lower end is free to move forward, the lock lug 54 thus passing over the top of the anti-creep lug 56 as the lock 6 is lifted or rotated. It is of course understood that the rotation of the lock lifter is keyed to the turning operation of the rotor by means of the key 38 already described. In the anti-creep release position (Figure 4) the lifter 10 has engaged the lower surface of the lock as at 90 against which it has sliding engagement for the purpose of rotating the lock. As the lifter 10 is further rotated, it forces the lock upwardly and backward, thus rotating the lock on its trunnions 46 and 50. This rotative movement of the lock continues until the locking face 92 (Figure 12) of the lock has been raised sufficiently to clear the tail of the knuckle as shown in Figure 5. In this position the extreme forward end or lock-set portion 94 of the lifter has passed under and behind the lock-set lug 96 (Figure 11) on the bottom portion of the lock (Figure 5) in which position the lock may rest on the lock-set end of the lifter. In this position of lock-set the knuckle, of course, is released to rotate.

Continued rotation of the rotor 12 and the lifter 10 in the same direction causes the face 72 of the lifter to engage the face 74 on the tail of the thrower 8 (Figures 5, 14, and 15), thus urging the thrower 8 in a counter-clockwise rotative movement about its trunnion 58 as viewed in Figure 9. This movement of the thrower 8 brings its forward end 86 into engagement with the thrower pad or lug 88 on the knuckle, thus causing rotation of the knuckle from its closed position (Figures 1 and 2) to the fully open position shown in Figure 7. As the rotation of the lifter 10 is continued from the lock-set position of Figure 5, the lock remains supported on the forward end 94 of the lifter, the said end 94 sliding along the surface 98 of the lock, thus supporting it until the knuckle has rotated to a position where its substantially horizontal tail surface 100 passes under the forward end portion 102 of the lock (Figures 6, 10, and 11). As the outward movement of the knuckle tail continues, the inclined surface 104 thereof passes under the lock and raises it sufficiently to permit the lock-set lug 96 on the bottom of the lock to clear the path of rotation of the lock-set end 94 of the lifter, the lock at this time resting upon the upper tail surface of the knuckle as at 106 (Figure 6). As the operating rod is then released, the lifter and the rotor return by gravity in a counter-clockwise direction of rotation, as viewed in Figures 3 to 8, to their normal position of rest as shown in Figures 3 and 6. After the lifter has returned to its normal position of rest the lock remains resting with its forward end on the knuckle tail as at 106 as already described and the lock is thus free to return to its normal position when the knuckle is closed as in a coupling operation and when the tail passes completely back or to the rear of the lock, the latter is free to fall to its normal locked position as shown in Figure 1. It will be apparent that when the lock is thus resting on the knuckle tail the impact of coupling which closes the knuckle will at the same time impart to the lock an impulse to move it from said raised position to its lower position of rest, that is, to the normal locked position of Figure 1.

As the lock drops to its normal locking position, thus rotating in a counter-clockwise direction from the position shown in Figure 6, the end of the anti-creep lug 54 engages the top of the lifter anti-creep lug 56 as at 108 (Figure 6), thus causing a slight clockwise rotation of the lifter to about the position shown in Figure 4 until the lug 54 has passed over the end of the lug 56 and has assumed its normal position at the rear thereof as shown in Figure 3. After the lug 54 passes beyond the end of the lug 56 the lifter 10 rotates back to its rest position (Figure 1) wherein the lug 56 projects in front of the lug 54, preventing rotative movement of the lock until the lifter itself is again rotated manually.

The method in which the lock is prevented from creeping by engagement of the anti-creep lug 54 with the anti-creep stop 56 has been clearly described above. It should be noted, however, that by means of this anti-creep the lock is positively secured against accidental rotation to unlocked position whether through the action of the knuckle locking face engaging against the side of the lock, thus causing a creeping movement, or through a bouncing action such as occurs on rough track. When such vigorous bouncing takes place, as frequently occurs in railway equipment, the forward end of the lock 6 may be thrown upwardly, particularly since the forward end is the heavier and thus has a greater inertia. However, any such upward movement of the forward end of the lock must be in the nature of rotation on the trunnions 46 and 50 and therefore the anti-creep lug 54 immediately comes into bearing against the anti-creep stop 56. Furthermore, the elongated hole 26 in the lifter is made slightly larger than necessary to accommodate the associated portion of the rotor, including the key 38. This permits the lifter 10 also to have a slight movement upwardly, when the coupler is in a bouncing action, and this upward movement of the lifter is limited by engagement of the anti-creep stop 56 on the shoulder 110 (Figure 8). The efficiency of the anti-creep is therefore increased by having a maximum area of engagement between the anti-creep lug 54 and the anti-creep stop 56.

When the parts have been lock-set as previously described and as shown in Figure 5, the removal of the parts from this lock-set position, as for example, in the uncoupling operation, is accomplished by the opening of the knuckle which would occur as the cars were separated. As the knuckle is rotated outwardly to open position (Figure 6), the inclined surface 104 sliding under the forward end portion 102 of the lock raises it sufficiently to release the forward end 94 of the lifter 10 from its engagement with the lock-set lug 96 of the lock (Figure 5). The lifter then rotates to its normal position (Figure 6) under the influence of gravity and under the impulse of the counterweight portion 43.

The positive return of the lifter 10 to its normal position of rest (Figures 3 and 6) under the influence of gravity is further insured by offsetting the rotor eye 41 forward of its axis, thus adding the weight of that portion of the rotor to the counter-weight 43 of the lifter 10. A still greater gravitational influence to cause this counter-clockwise rotation is the weight of one end of the operating rod itself which is supported in the offset eye 41 in the manner already described.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a car coupler the combination of a coupler head, a knuckle pivoted therein, a lock operable therein, a lifter, a rotor, and a knuckle thrower having a knuckle engaging arm and an operating arm, a lock-set shoulder and an anti-creep lug on said lock, said lifter being operable to raise said lock to lock-set position by cam engagement therewith wherein said lock is supported by abutment of said lifter against said shoulder, and further operable to rotate said knuckle thrower to open said knuckle by cam engagement with said operating arm, said lifter having an anti-creep stop integral therewith, said lug and said stop having abutment against each other when said parts are in locked position to prevent a creeping action of said lock, and said lifter and said rotor being keyed together for rotary movement when assembled in operative position.

2. In a car coupler the combination of a coupler head, a knuckle pivoted therein, a lock, a lifter, a knuckle thrower having a thrower arm and an operating arm, and a rotor operable in said head, a lock-set lug on said lock, said lifter being rotatable to raise said lock by cam engagement therewith and to retain said lock in lock-set position by abutment with said lug, and further rotatable to engage said operating arm and rotate said knuckle to raise said lock from lock-set position whereby said lifter may return to normal position, said lifter and said lock having cooperating means providing an anti-creep for said lock, said lock being rotatable about trunnions integrally formed adjacent its rear end about which said lock rotates from one position to another, whereby said lock in raised position receives from coupling impact a falling impulse in the direction of its normal locked position.

3. In a car coupler the combination of a coupler head, a knuckle pivoted therein, a lock, a lifter, a knuckle thrower, and a rotor operable in said head, a lock-set shoulder on said lock, said lifter being rotatable to raise said lock by cam engagement therewith and to retain said lock in lock-set position wherein said lock is supported on said lifter by abutment of said lifter with said shoulder, and means on said thrower cooperating with means on said lock for retaining said lock in operable position after assembly of said parts.

4. In a car coupler the combination of a coupler head, a knuckle pivoted therein, other operable parts housed in said head comprising a lock with a lock-set shoulder, a lifter, a rotor, and a thrower having oppositely disposed arms, each of said other parts being rotatable about trunnion axes, certain of said trunnion axes lying in a vertical plane and other of said axes in a horizontal plane, said lifter being operable to raise said lock to lock-set position by cam engagement therewith wherein said lifter supports said lock by abutment with said shoulder, said knuckle being rotatable to raise said lock from lock-set position, whereby said lifter is released from cooperation with said shoulder and returned to its normal position of rest.

5. A car coupler comprising a coupler head, a knuckle pivoted therein, a lock having a lock-set shoulder, a lifter, a rotor, and a knuckle thrower, said lifter being rotatable to raise said lock to lock-set position by cam engagement therewith wherein said lock is supported by abutment of said lifter with said shoulder, cooperating means on said lifter and said lock forming an anti-creep for said lock, and cooperating means on said thrower and said lock for retaining said lock in operative position after assembly.

6. In a car coupler the combination of a coupler head, a knuckle pivoted therein, a lock having a lock-set lug, a lifter, a rotor, and a knuckle thrower operably associated in said head, said lock, said lifter, said rotor and said knuckle thrower being operable about trunnion axes, certain of said trunnion axes lying in a vertical plane and other of said axes in a horizontal plane, said lifter being rotatable to operate said lock by cam engagement therewith from its lower-most or locked position to lock-set position wherein said lock is supported by abutment of said lifter against said lug, said knuckle being rotatable to lift said lock by cam engagement therewith from said lock-set position and free said lifter from cooperation with said lock, said first-mentioned cam engagement traversing a portion of said lock disposed adjacent the forward end of said lock remote from the trunnion portions thereof, whereby maximum leverage is available for raising said lock.

7. In a car coupler the combination of a coupler head, a knuckle pivoted therein, a lock, a lifter, a rotor, and a knuckle thrower operable within said head, said lifter having a cam surface adjacent its forward end and being rotatable to raise said lock by engagement of said surface with the forward portion of said lock remote from the pivot point of said lock, and further rotatable to engage and rotate said knuckle thrower, said lock being rotatable about trunnions at its rear end, the entire mass of said lock being disposed forwardly of said trunnions and substantially the entire mass thereof being disposed above said trunnions when said lock is in lock-set position whereby the impact of coupling imparts a maximum falling impulse to rotate said lock from its raised position to its normal locked position, said lock in said last mentioned movement engaging said lifter to rotate same and establish an anti-creep therewith.

8. In a car coupler the combination of a coupler head, a knuckle pivoted therein, a lock having rear trunnions, a lifter, a rotor, and a knuckle thrower operable in said head, said knuckle thrower having a thrower arm and an operating arm, said lifter having cam means adjacent its forward end and being rotatable to raise said lock by engagement of said means with the forward end of said lock remote from said trunnions, and further rotatable to engage one of said arms and operate said knuckle thrower for movement of said knuckle, movement of said lock from raised position to locked position being effective to rotate said lifter and establish an anti-creep therewith.

9. A car coupler comprising a coupler head and parts operable therein including a lock, a lifter, a knuckle thrower, and a rotor, each of said parts being retained in assembled relationship by other of said parts, and at least one of said parts being rotatable about a vertical trunnion.

10. A car coupler comprising a coupler head and parts operable therein including a lifter having an elongated slot, and a rotor having means received in said slot and having vertical clearance therein, whereby said lifter and said rotor rotate as a unit while permitting vertical movement of said lifter with respect to said rotor.

11. In a car coupler the combination of a coupler head, a knuckle pivoted therein, a lock having a lock-set lug, a lifter, a knuckle thrower, and a rotor operable in said head, said lifter having cam means adjacent the forward end and being operable to raise said lock by engagement of said cam means adjacent the forward end of said lock and to retain said lock in lock-set position by abutment of said lifter against said lug, said lifter and said lock having cooperating anti-creep means, and means on said thrower engaging means on said lock to retain said lock in operative position.

12. In a car coupler the combination of a coupler head, a knuckle pivoted therein, a lock having a lock-set shoulder, a lifter, a rotor, and a knuckle thrower operably associated in said head, said lock, said lifter, said rotor, and said knuckle thrower being operable about trunnion portions, said lifter having cam means adjacent its forward end and being rotatable to engage said means with the forward end of said lock and raise said lock from its lower-most or locked position to its lock-set position wherein said lifter abuts said shoulder, each of said operating parts except said knuckle retained in assembled relationship by other of said parts, and at least one of said trunnion portions having a vertical axis.

13. A car coupler comprising a coupler head, a knuckle pivoted therein, and operating parts comprising a lock having lock-set means, a lifter, a rotor, and a knuckle thrower having an operating arm, said lifter having cam means adjacent its forward end and being rotatable to raise said lock to lock-set position by engagement of said cam means with the forward end of said lock, and further rotatable to engage said operating arm and rotate said knuckle thrower for movement of said knuckle, said lock having a pulling lug on its guard arm side in abutment with a shoulder on the guard arm wall of said head when said lock is in locked position.

14. A car coupler comprising a head and parts operable therein including a lock having lock-set means, a lifter having cam means, a rotor, and a knuckle thrower having an operating arm, all of said parts having movement of rotation about trunnion portions, said lifter being rotatable to engage said cam means with the forward end of said lock and raise said lock to lock-set position wherein said lock is supported on said lifter by abutment of said lifter with said lock-set means, said lifter and said lock having cooperating anti-creep means adjacent their rear ends, movement of said lock from lock-set to normal position causing rotation of said lifter by sliding engagement of said anti-creep means, whereby the anti-creep means on said lock may be disposed rearwardly of the anti-creep means on said lifter.

15. In a car coupler the combination of a coupler head, and operable parts comprising a knuckle, a lock rotatable about trunnions at its rear end, a lifter, a rotor, and a knuckle thrower having an operating arm, said lifter having cam means adjacent its forward end and being rotatable to raise said lock by engagement of said cam means with a portion of said lock remote from said trunnions, and further rotatable to engage said operating arm and rotate said knuckle thrower, and means on said knuckle thrower limiting rotation of said lifter, movement of said lock from raised position to locked position being effective to rotate said lifter and establish an anti-creep therewith.

16. In a car coupler the combination of a head, a pivoted knuckle, a lock having lock-set means, a lifter, a knuckle thrower, and a rotor operable in said head, said lifter having a slot and said rotor having a key retained within said slot whereby said lifter and said rotor are keyed together for rotative movement, said lifter having cam means adjacent the forward end and being rotatable to raise said lock to lock-set position by engagement of said cam means with the forward end of said lock, said knuckle having means engageable with said lock to release said lock from lock-set position, anti-creep means on said lock and said lifter, rotation of said lock from lock-set to normal position causing engagement between said anti-creep means and rotation of said lifter to make said anti-creep means effective.

17. A car coupler comprising a head and parts operable therein including a lock having lock-set means, a lifter, and a knuckle thrower having opposed arms, said lifter having cam means operable on rotation of said lifter to engage the forward end of said lock and raise said lock to lock-set position wherein said lock is supported on said lifter by engagement of said lifter with said lock-set means, said lifter being further operable to engage said cam means with one of said arms and rotate said thrower, and means on said thrower retaining said lock in operative position after assembly.

18. A car coupler including a head and parts operable therein comprising a lock, a lifter, a rotor, and a knuckle thrower, all of said parts having movements of rotation about trunnion portions on certain of said parts, said knuckle thrower having means cooperating with means on said lock whereby the latter is retained in assembled position, and cooperating means on said thrower and said lifter limiting the rotation of said lifter.

19. A car coupler having a head and parts operable therein including a lock, a lifter, a knuckle thrower, and a rotor, said lifter being mounted on said rotor to rotate therewith, said thrower and said lock having means cooperating to retain said lock in assembled relationship, and said lifter and thrower having means cooperating to limit rotation of said lifter.

20. In a car coupler the combination of a coupler head, a knuckle, a lock, a lifter, a rotor, and a knuckle thrower operable in said head, said knuckle thrower having an operating arm, said lifter having cam means adjacent its forward end and being rotatable to raise said lock by engagement of said means with the forward end of said lock, and further rotatable to engage said arm and operate said knuckle thrower for movement of said knuckle, said lock having trunnion means at its rear end, substantially the entire mass of said lock being disposed upwardly of said trunnions in lock-set position, whereby the impact of coupling imparts a maximum falling impulse to rotate said lock from lock-set position to normal locked position, movement of said lock from lock-set to normal position being effective to rotate said lifter and establish an anti-creep therebetween.

21. In a car coupler a head having a bottom wall, a lock supported at its front end on said wall and having trunnions at its rear end, lock-set means on said lock between said trunnions and said point of support, a rotatable lifter having cam means engageable with said lock between said lock-set means and said point of support and operable to lift said lock by sliding engagement therewith, substantially the entire mass of said lock being disposed forwardly and upwardly of said trunnion portions when in lock-set position, whereby the impact of coupling imparts a maximum impulse to rotate said lock from its raised position to normal or locked position, movement of said lock from lock-set to normal position being effective to rotate said lifter and establish an anti-creep therebetween.

22. In a car coupler a head, a lock, a lifter, a rotor and a knuckle thrower operable therein, said lock having trunnions at its rear end and lock-set means at an intermediate point, said lifter having cam means adjacent its forward end engageable with said lock remote from said trunnions and forwardly of said lock-set means upon rotation of said lifter, whereby maximum leverage is available to raise said lock from locked to lock-set position, said lock being operable on release from said lock-set position to impart rotative movement to said lifter and establish an anti-creep therewith.

23. In a car coupler a lock having a plurality of trunnion means at its rear end, a relatively heavy mass at its forward end, anti-creep means adjacent said trunnion means, a pulling shoulder at an intermediate point, and a lock-set lug adjacent said pulling shoulder.

24. In a car coupler a lock having a trunnion portion at the rear end and a relatively heavy mass at the forward end, a pulling shoulder at an intermediate point, and lock-set means adjacent said pulling shoulder, the entire mass of said lock in all operative positions thereof being disposed forwardly of said trunnion portions.

25. In a car coupler a head, parts operable in said head comprising a lock having lock-set means, a knuckle thrower, a rotor, a lifter pivotally mounted on said rotor, cooperating anti-creep means on said lifter and said lock adjacent their rear ends, and cam means on the forward end of said lifter cooperable with the forward end of said lock to rotate said lock from locked to lock-set position wherein the forward end of said lifter is in abutment with said lock-set means.

26. In a car coupler a head, parts operable in said head comprising a lock having lock-set means, a knuckle thrower having an arm, a rotor, a lifter pivotally mounted on said rotor, cooperating anti-creep means on said lifter and said lock adjacent their rear ends, and cam means on the forward end of said lifter cooperable with the forward end of said lock to rotate said lock from locked to lock-set position wherein the forward end of said lifter is in abutment with said lock-set means, said lifter being further rotatable to engage said cam means with said arm and operate said thrower.

27. In a car coupler, a head, a knuckle, a lock, a lifter, and a rotor, said rotor forming the axis about which said lifter rotates, means on the rear of said lock abutting means on the rear of said lifter to form an anti-creep, said lifter being rotatable to disengage said parts, release said anti-creep, and support said lock in lock-set position, said knuckle being so formed that on being opened it will raise said lock from lock-set position and said lock being formed to then allow said lifter to return to normal position, and said lock being further formed so as to be operable on movement to locked position to rotate said lifter out of normal position and re-engage said anti-creep.

EDMUND P. KINNE.